United States Patent Office 3,222,551
Patented Dec. 7, 1965

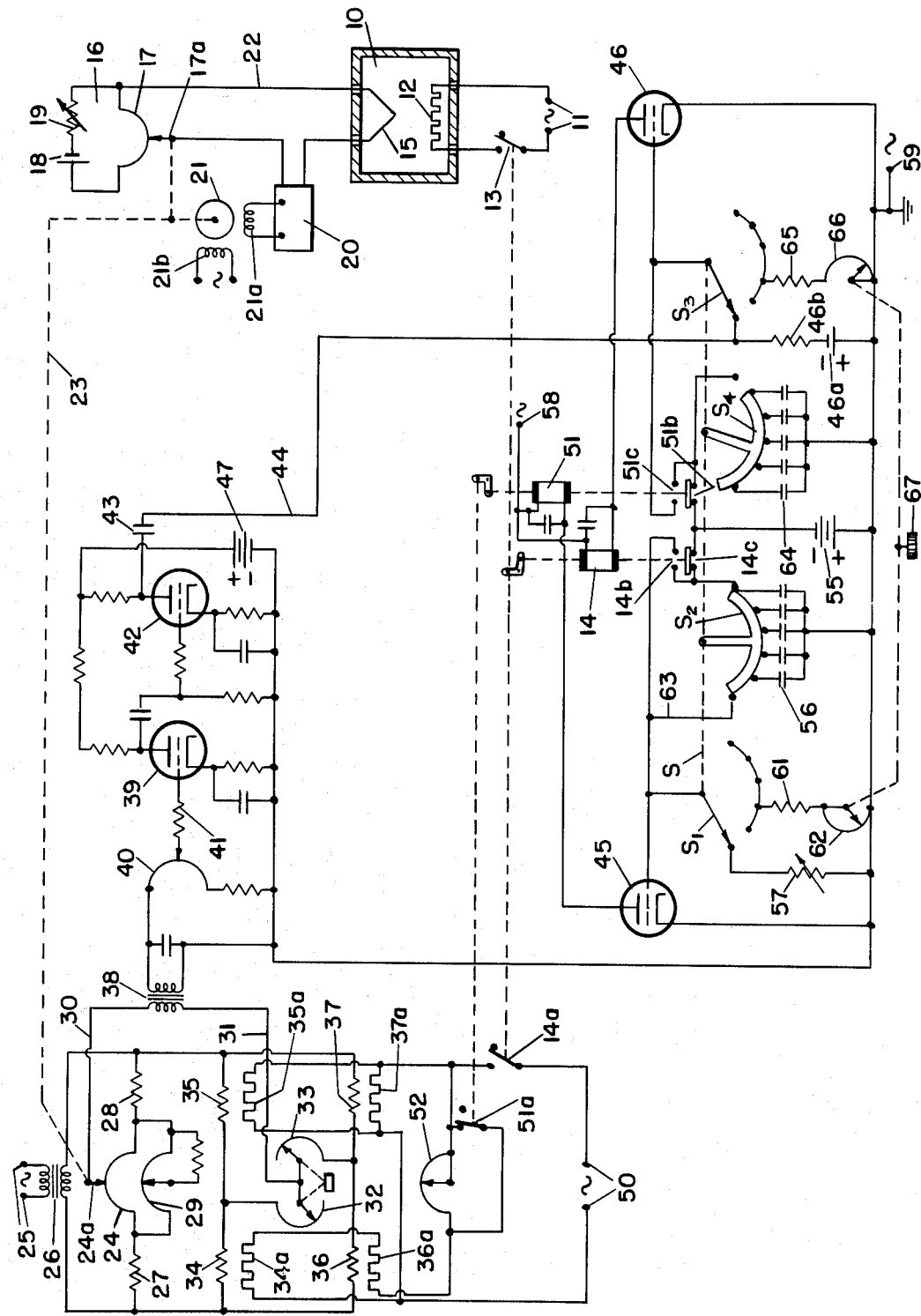

3,222,551
SYSTEM FOR CYCLICALLY PRODUCING CONTROL IMPULSES OF PREDETERMINED LENGTH AND FREQUENCY
Harry B. Rath, Elkins Park, Pa., assignor to Leeds and Northrup Company, Philadelphia, Pa., a corporation of Pennsylvania
Filed Sept. 1, 1961, Ser. No. 135,538
13 Claims. (Cl. 307—97)

This invention relates to control systems of the duration-adjusting type where the magnitude of a controlled variable is changed by variation of the average time a final control element maintains a control medium at one or the other of two condition-changing levels and has for an object the provision of circuit arrangements by means of which the final control element may be manually controlled with variation through a relatively wide range of the ratio of on-time (the controlled medium at its high level) to the off-time (the controlled medium at its low level) and without change of the magnitudes of any of the circuit components utilized for the automatic control of the ratio of on-time to off-time of the final control element.

As well understood by those skilled in the art, the magnitude of a condition (also referred to as the controlled variable) may be maintained at a control point closely corresponding with a predetermined desired magnitude thereof, by varying the average time the final control element maintains a control medium at one or the other of two levels of magnitude. Such a system for an on and off valve or switch has been referred to as embodying average-position action, and alternatively and more broadly as a system of the duration-adjusting type.

As explained in Davis Patent 2,823,861 and also in his Patent 2,797,291, systems of the duration-adjusting type may also include reset and rate control actions better to meet the needs of a particular problem of process control. In said Patent 2,797,291, there is described (in connection with FIG. 9) a system using resistor-capacitor networks to provide the control action and by means of which both manual and automatic control of the final control element may be effected. This is done by manual adjustment of certain of the components utilized in the automatic control of the final control element.

In accordance with the present invention there is provided a pulse-generating system for cyclically producing control pulses of predetermined relative length and frequency with both length and frequency manually adjustable to vary the ratio of the on-time to the off-time of the final control element. A part of the system for producing or generating these control pulses is then utilized on automatic control to provide a rate of approach action for a second system which generates control impulses of relative length and frequency determined by the magnitude of the condition including its deviation from the set point as well as its integrated deviation from the set point as provided by reset action. The rate of approach action produces a limit on the reset action of the controller and is initiated whenever the control element remains in one or the other of its positions for a length of time greater than a predetermined amount. More particularly, the manually controlled impulse generator comprises a bistable multivibrator or flip-flop circuit having its output circuits cross-connected to its inputs by means of relays, the respective contacts of which are utilized upon energization to connect first one control circuit of the multivibrator to a timing network and then to connect the other input circuit to a similar timing network with transfer of each timing network to a charging means upon deenergization of the respective relays. The time constants of the timing networks are independently and manually adjustable, thereby to vary the ratio of on-time to the off-time of the final control element which is controlled by one output of the multivibrator.

Upon transfer to automatic operation, the bistable multivibrator circuit continues to be utilized, half of it for introducing a rate of approach action with a part of the other half acting as a final output stage for the second system used to control the operation of the final control element. Thus, that final control element is at all times operated by one of the aforesaid two relays under the control of the same output circuit, whether the system be operating under manual control or automatically. Accordingly, when there is transfer from manual control to automatic, it is of a bumpless character, that is to say, the network of the second system for automatic control is conditioned to take over the control of the final control element with the on/off ratio approximating that established by the manually controlled multivibrator.

For further objects and advantages of the invention, reference is to be had to the following detailed description taken in conjunction with the accompanying drawing in which there has been diagrammatically illustrated a preferred embodiment of the invention.

Referring now to the drawing, there will first be presented a description of many features of the present invention common to the disclosure of FIG. 6 of Davis Patent 2,823,861. There will then be set forth in detail the features of the present invention and the manner in which they cooperate together to provide greater flexibility in the operation and control of a final control element 13.

The invention has been shown as applied to the control of the temperature of a furnace 10, though it is to be understood it is equally applicable to the control of the magnitude of any condition. To maintain the temperature of the furnace 10 at a set point, the controlled medium in the form of current flowing from input terminals 11 generates heat by means of a heating resistor 12 energized by the operation of a final control element 13 illustrated as a circuit-making and breaking device. This device may be operated either as by a relay 14 or by a heavy duty contactor under the control of said relay. Variation in the magnitude of the controlled variable is detected by the measuring junction of a thermocouple 15, the output of which is opposed by a voltage derived from a potentiometer 16 which includes a slidewire 17, a battery 18, and a series rheostat 19. By means of a conventional detecting and amplifying device 20, a motor 21 having a control winding 21a and a power winding 21b adjusts slidewire contact 17a in a direction to reduce the difference between the potential developed by thermocouple 15 and the potential difference between conductor 22 and slidewire contact 16a. Though not illustrated, the balancing motor 21 may be utilized to drive the pen and index of a recorder of a type well known to those skilled in the art.

It is to be noted that the motor 21, through a mechanical connection 23, relatively adjusts a slidewire 24 and its contact 24a to unbalance a bridge-type of circuit energized from a suitable source of supply indicated by the input terminals 25 of an input transformer 26. The slidewire 24 forms in conjunction with resistors 27 and 28 two arms of a Wheatstone bridge, an additional shunting slidewire 29 being provided in parallel with slidewire 24 for adjustment of the proportional band. The control slidewire 24 forms part of a control circuit including conductors 30 and 31, the former being connected directly to the slidewire contact 24a. The conductor 31 is connected to the two adjustable contacts of resistors 32 and 33, the former having one side connected to the common point between resistors 34 and 35 forming two additional arms of the above-referred to bridge circuit. An additional pair of resistors 36 and 37 form two arms or branches of an additional bridge circuit, the adjustable resistor 33 having one side connected directly to the common point between resistors 36 and 37. Any unbalance voltage from the combined bridge circuit is developed across the output conductors 30 and 31, and thus an output transformer 38 applies the unbalance signal to the input circuit of a first amplifying stage 39. This input circuit includes a potentiometer 40 and a grid coupling resistor 41. The output signal from the first amplifying stage 39 is applied to a second amplifying stage 42 with its output applied by way of a coupling capacitor 43 and the conductor 44 to the input circuit of the final amplifying stage 46.

The input circuit for the amplifying stage 46, shown as a triode and comprising any suitable electron control device, includes a bias battery 46a and a series resistor 46b. These are provided to assure that the tube 46 remains non-conductive in the absence of an input signal to its gird or control electrode. In this connection, it will be noted that from the amplifying stage 42 there is applied to the grid of tube 46 an alternating current input signal, and thus the connections to the primary winding of the transformer 26 and the connections of the alternating current source to the terminals 58 and 59 will be made to provide phase matching for operation of the tube 46 to be conductive whenever the phase of the input signal applied to the gird of tube 46 has an instantaneous positive polarity at the same time there is an instantaneous positive polarity of the alternating current applied to its plate or anode. This occurs, of course, only with unbalance of the bridge in one direction. When the unbalance is in the other direction the tube 46 remains non-conductive. It may be further noted that the electron control device or triode 46 operates in response to an alternating current signal on its grid when receiving an output from the bridge, but that its conductivity is controlled by a unidirectional bias when operating as described below as a result of discharge of the bank of capacitors 64 through a discharge circuit hereinafter to be described.

The circuit for control of tube 46 from the amplifying stage 42 may be traced through the contacts S₃ of a gang switch S. The amplifying stages 39 and 42 are conventional and their plate supply has been illustrated as a battery 47.

As fully explained in connection with FIG. 6 of said Davis Patent 2,823,861, the resistors 34–37 have respectively associated therewith heating resistors 34a–37a. Each resistor-heater assembly (as more fully explained in Davis Patents 2,300,537 and 2,325,232) has a differing thermal inertia. The assembly 34–34a has a greater thermal inertia than assembly 35–35a and assembly 36–36a has a greater thermal inertia than assembly 37–37a while the assemblies 34–34a, 35–35a and 37–37a have lesser thermal inertia than the assembly 36–36a. Thus, the temperature change of resistors 34 and 36 will occur relatively slowly in comparison respectively with the temperature changes produced by like heat inputs to the heaters associated with the resistors 35 and 37 with the temperature change of resistor 36 being slowest. The resistors 34–37 are designed to achieve the same final temperature and resistance values when continuously energized by the same voltage, since all are constructed of material having the same, but relatively high, temperature coefficients of resistance. The heater circuits are energized upon closure of contacts 14a of relay 14, and these contacts remain closed during the on-time or time of closure of the switch 13 forming the final control element.

If it be assumed that the furnace 10 has been operating at its set point and that the contact 14a has moved to its open position due to balance of the bridge and no signal appearing on lines 30 and 31, it will be understood that the previously heated heater-resistor assemblies will begin to cool. Due to their lesser thermal inertia, the temperature of resistors 35 and 37 will decrease more rapidly than resistors 34 and 36.

As this cooling takes place, unbalance of the bridge occurs and a resultant voltage is applied to the output transformer 38. Such an output voltage will be of such phase as to produce energization of relay 14 which thereupon closes switch 13 and contact 14a. The latter energizes heating resistors 35a–37a connected across alternating current supply terminals 50. The thermal inertia of assemblies 35–35a and 37–37a may be selected to attain their maximum temperatures in about a minute, while the assembly 36–36a may require one-half hour to attain maximum temperature. The assembly 34–34a will be designed to attain its maximum temperature in about two minutes. By reason of these provisions, it will be seen that the bridge will be returned to balance by the differing changes in resistance of the resistors in the several arms of the bridge. The resultant disappearance of the output signal deenergizes relay 14 with opening of switch 13 and contact 14a. The action of the bridge circuit is modified by the relative adjustment of the slidewire contact 24a of the slidewire 24 with change of the magnitude of the controlled variable, the temperature of furnace 10. When that temperature is at the set point, the contact 24a will be in its mid position on slidewire 24. The set point may be changed by manual change of position of the slidewire 24 where the contact 24a is adjusted by motor 21 in response to the magnitude of the condition under control and vice versa. When there is deviation from the set point, the contact 24a will be moved to the right or to he left, thus to introduce unbalance in the bridge circuit to produce an output signal upon a deviation above and below the set point. When contact 24a is moved to the right, the point of bridge balance will be changed so that a greater cooling time will be required to produce an output signal of proper phase to cause switch 13 and contacts 14a to close. This means the switch 13 will remain in its open position for a longer period of time to achieve the needed cooling and temperature reduction of furnace 10. Because the resistance of resistors 35 and 37 and their temperatures are lower for balance of the bridge under these conditions their heating curve will be steeper than their cooling curve. It is in this manner that the final control element 13 is cycled with change in the ratio of its on-time to its off-time dependent upon devitation of the controlled variable from its set point as well as upon the time during which the contact 14a remains in its closed position, since the latter operation determines the average temperature of the heater-resistor assemblies of the bridge circuit during a given cycling operation.

Since a change in the magnitude of the condition under control from the set point produces a change in the average heat input to the assemblies 34, 34a–37, 37a the temperature of the assemblies 34, 34a and 36, 36a will, due to their greater thermal inertias, gradually change. This change of temperature and accompanying change of resistance will produce an automatic change in the ratio of on-time to off-time until the magnitude of the condition is returned to the set point or the switch 13 remains in one or the other of its positions. Such action produced by resistors 34 and 36 is commonly referred to as reset action. Adjustment of the rate of the reset action is accomplished by changing the position of the contacts of slidewire resistors 32 and 33.

If the load demand is high, then the on-time will increase and the off-time will decrease. Thus, the switch 13 will cycle between open and closed positions with a decrease in frequency of operation and with a higher ratio of on-time to off-time. If the load demand be sufficiently great, as upon the initial loading of the furnace 10 with work, the temperature will fall below the set point for a long period of time and the final control element 13 may as a result of the reset action remain continuously in its closed position. In that event and absent a rate of approach action, there may be required a movement of the contact 24a past its mid position on slidewire 24 to reverse the input (phase) to the amplifier to deenergize the relay 14. This would mean that the temperature would have to exceed its set point in order to produce the cylic action of the switch 13. By reason of the connections of an electron control device 45 in association with a relay 51, a rate of approach circuit including an adjustable rheostat 52 is rendered effective by the opening of contacts 51a to introduce a rate-of-approach action.

As explained in said Davis Patent 2,823,861, the opening of contact 51a produces a reduction of the heating current through series-connected heating resistors 34a and 36a. By reducing the heating current to a value determined by the setting of a rheostat 52, there is reduced the upper temperature limit to which the resistors 34 and 36 may be heated, and thus there is limited the extent of unbalance introduced by them into the bridge to a value materially below their upper limit. It is in the manner that balance of the bridge is attained while the temperature is below the set point, and thus there is initiation of the cycling action prior to the attainment of the set point with consequent avoidance of overshoot.

The foregoing rate of approach or reset limiting action is accomplished by reason of the operation of a single-pole, double-throw switch comprising contacts 14b and 14c operated by the relay 14 concurrently with operation of the final control element 13. Thus as shown in the drawing (the final control element in its off position), there is completed from a source of charging current shown as a battery 55 a charging circuit for a bank of capacitors 56. The voltage across the capacitors will be that of the battery 55. When the relay 14 closes the circuit through the switch 13, the capacitors 56 are disconnected from the charging source 55. They discharge through a discharge circuit completed through the contacts $S_1$ of transfer switch S and by way of an adjustable discharge resistor 57 and thence to the other side of the capacitors. The polarity of the charging source 55 is such that the electron control device 45 is biased to its off or non-conductive state. If the relay 14 is cycling normally the capacitors 56 and the charging source 55 maintain the device 45 non-conductive at all times. If, however, the relay 14 remains in its energized state for a long period of time, the voltage of the capacitors 56 approaches zero as a limit. The device 45 is then rendered conductive and relay 51 is energized from a suitable alternating current source indicated by the supply terminals 58 and 59. The relay 51 opens its contacts 51a and thus introduces the rate of approach action just described. By adjustment of resistor 57 the discharge time of capacitors 56 can be determined to provide selection of the time the relay 14 must remain energized for initiation of the rate of approach action.

With the above understanding of the operation of the system, it will now be assumed that it is desired manually to control the final control element 13 and manually to vary as desired the ratio of off-time to on-time and without change in the settings of any of the components of the bridge circuit above described. For this purpose, the transfer switch S is operated to disconnect the bank of capacitors 56 from the discharge circuit 57 and to complete a second discharge circuit for them by way of contacts 14b, a resistor 61 and a variable resistor 62. The switch contact $S_2$ in the form of a segment is rotated in a counterclockwise direction to interrupt the connection of the capacitors by way of a conductor 63 to the grid of the electron control device 45. This change then makes effective the contacts 14b to control the connection of one side of the capacitors to the control circuit of the device 45. Counterclockwise rotation of the segmental contact $S_4$ completes a circuit alternatively by way of contacts 51b to the charging source 55 for a bank of capacitors 64. The operation of the contact $S_3$ disconnects control circuit device 46 from the conductor 44 and completes a connection of that input circuit to a discharge circuit for the bank of capacitors 64 by way of a fixed resistor 65 and an adjustable resistor 66. This discharge circuit is opened and closed by contacts 51c of relay 51.

Remembering that during automatic operation, the bank of capacitors 56 was alternately charged and discharged, it will be seen that it will have acquired a charge at the time of operation of the transfer switch S, while the bank of capacitors 64 will not have acquired a charge. Accordingly, it may be assumed that the electron control device 46 will preferentially be made conductive with resultant energization of the relay 14 which closes its contacts 14b to apply the negative voltage on capacitors 56 to the control circuit of the device 45 to render it non-conductive. Thus, this electron control device will be biased to its non-conductive state until discharge of the bank of capacitors 56 through the discharge circuit including resistors 61 and 62. The relay 14, of course, operates the final control element to its on-position for generating heat within the furnace 10. Meanwhile, the bank of capacitors 64 is receiving a charge from source 55 by way of relay contacts 51b. As the charge on the first bank of capacitors 56 approaches zero as a limit, the electron device 45 becomes conductive for energization of the operating coil of relay 51. The closing of its contacts 51c applies the negative potential from the capacitors 64 to the grid of tube 46, thereby turning off that tube to deenergize the relay 14. This relay, in opening, closes the charging circuit through its contacts 14c for the bank of capacitors 56.

The capacitors 64 immediately begin to discharge through the discharge circuit including resistors 65 and 66. As the voltage across these capacitors decreases with zero as a limit, the tube 46 again becomes conductive. Thus the electron control devices 45 and 46 operate as switching devices to form a bistable flip-flop or multivibrator circuit with the outputs thereof cross-connected to their inputs by way of the relays 14 and 51 and with independently adjustable timing networks respectively comprising the bank of capacitors 56 and its adjustable discharge circuit 61, 62 and the bank of capacitors 64 and its adjustable discharge circuit 65, 66. By operating the transfer switch S in a counterclockwise direction, there may be simultaneously selected the number of capacitors included in the charging and discharging circuits. By adjusting, as by knob 67, the resistance of the discharge resistors 62 and 66 to increase the resistance of one while decreasing the resistance of the other, any desired time-constants may be established as between the two timing circuits, thus varying as may be desired the ratio of on-time to the off-time in respect to the operation of the final control element 13.

The above adjustments likewise vary the frequency of the control impulses developed for energization of the relay 14. Thus if the resistance-capacitance ratios of both timing networks are adjusted in the same direction, the frequency of appearance of the control pulses is changed. As the resistance in each discharge circuit rises, the frequency decreases. As the resistance in each discharge circuit is decreased, the length of the control pulses and the on-time of the final control element 13 decreases. If the segment $S_2$ be independently adjustable, though in practice the individual capacitors 56 may be made adjustable, there may be varied the time that the relay 51 remains deenergized independently of the time constant of the discharge circuit for the electron control device 46. A change in capacitance is not as convenient as adjusting the resistance of the respective discharge circuits. In the preferred form of the invention, the discharge resistors are concurrently adjusted in the opposite direction in the two circuits, but it is within the scope of the present invention individually to adjust them.

In the preferred form of the invention as illustrated, the ratio of on/off time of one relay, such as relay 14, will be increased as the ratio of on/off time of the relay 51 will be decreased. Thus either of the relays 14 and 51 may be utilized to provide control effects in the process under control, and particularly where a differential type of control may be desired, as for example, one in which the opening of one valve is to be increased, while the opening of a second valve is to be decreased.

The flexibility afforded during manual operation is adequate to meet widely varying requirements of process control problems and of nature more complex than the simple furnace 10 used for illustrative purposes in explaining the invention. An operator may, by watching an indicator of temperature, see precisely how the ratio of on-time to off-time is affecting the temperature of the furnace 10 (and in the same way controlled variables of other processes) and can quickly come to a ratio best deemed to suit the existing requirements of the process under control. During this manual adjustment of the ratio of on-time to off-time, it is to be noted that the sensitive element or thermocouple 15 continues to respond, as does its associated measuring circuit and that the contact 24a in the bridge network will be concurrently adjusted to adjust the balance point of the network. Similarly, the switch contact 14a will be closed and opened concurrently with the operation of the final control element 13, thereby to energize the resistors 34a–37a to modify the resistance values in the respective arms of the bridge. Accordingly, though the ratio of on-time to off-time be wholly under manual control, nevertheless the impulse-generating system for automatic control is at all times conditioned for the resumption of the control of the final control element 13 with what is known to the art as bumpless transfer. In this connection, it is to be noted that the rate of approach switch 51a is operated concurrently with the operation of relay 51. Thus when the transfer switch S is returned to its illustrated position for automatic control, there will be resumed on/off operation of the final control element 13 corresponding rather closely with the on/off ratio time being utilized under manual control.

Now that there has been explained a preferred embodiment of the invention and the manner in which a bistable flip-flop circuit has been utilized for producing control impulses of variable and controlled lengths and of variable frequency in conjunction with the second system of generating impulses for automatic control, further variations will occur to those skilled in the art. For example, the bridge circuit, which may be described as an impulse-generating system, may be of other kinds, such for example, as the system of FIG. 1 of said Davis Patent 2,823,861. The rate of approach action as provided by the contacts 51a of relay 51 may take the form of the device shown in said Davis Patent 2,823,861. Reference is to be had to the appended claims for definitions of the scope of the present invention, and which in its preferred form includes the bistable multivibrator or flip-flop circuit in which the two electron control devices are utilized in conjunction with their associated timing circuits for the generation of impulses of controlled length and frequency and are also used in the automatic system for different but helpful purposes, as already set forth at length.

While the electron control devices have been illustrated as triodes, any conventional form of a bistable multivibrator may be utilized and in which there will be included switching means which can by control circuits be alternately rendered conductive and non-conductive for operation of the circuit controllers for the charging and discharging circuits of the timing means illustrated as the resistance/capacitance networks in the drawing. While the final control element has been illustrated as an on/off type of switch, those skilled in the art understand that final control elements utilized in control systems of the duration-adjusting type are operable between two levels, in each of which the magnitude of the controlled variable—heating current in the instant case—is established at first one level and then a second level. Where the lower level is not zero, as by providing a resistor in shunt with the contacts 13 for continued flow of heating current at a predetermined low level, the variation will be between that low level and the upper level with such a resistor short-circuited. With this explanation, it will be understood that similar elements may be utilized for valves where such a valve will have its low level corresponding with a partly open position and the high level with the valve opened to a greater and predetermined amount.

What is claimed is:

1. A system for cyclically producing control impulses of predetermined length and frequency comprising first and second electron control devices having input and output electrodes, resistive-capacitive networks, biasing means for each of said resistive-capacitive networks, circuit controllers associated with said devices and selectively operable concurrently to connect the capacitance of one of said networks to said biasing means to receive a charge and to establish a discharge circuit for the capacitance of the other of said networks, said polarity of said biasing means developing charges on said capacitances to render said devices non-conductive and upon dissipation of the charge rendering said devices conductive, operating means for the circuit controller associated with said first control device including an energizing circuit connected to an output electrode of said second control device, and operating means for the circuit controller associated with said second device including an energizing circuit connected to an output electrode of said first device whereby said capacitances of said networks are alternately charged and discharged for cyclically producing conduction of first one and then the other of said control devices for development of control pulses the lengths and frequencies of which pulses are determined by the respective time constants of said networks.

2. The system of claim 1 in which said resistance-capacitance ratios of said networks are adjustable both in the same direction to vary the frequency of said control impulses and both adjustable in the opposite direction to vary the length of said control impulses relative to the time between said impulses.

3. The system of claim 2 in which an increase only of the capacitance of the network associated with one of said devices increases the time that device remains non-conductive compared with the time the other of said devices remains nonconductive.

4. The system of claim 2 in which an increase in the value of the resistance of a network associated with one of said devices increases the time that device remains non-conductive.

5. A system for cyclically producing control impulses of selected length and frequency comprising first and second switching devices having input switching circuits and output circuit means rendered conductive and non-conductive by said switching circuits, capacitive means for each said device, a unidirectional source of voltage for each of said capacitive means, circuit controllers for each of said switching devices, circuit connections for said devices each respectively including one of said output circuit means and one of said circuit controllers selectively and alternately operable concurrently to connect said capacitive means associated with one of said devices to said unidirectional source of voltage to receive a charge and concurrently disconnecting the other of said capacitive means from its associated unidirectional source and for completing a connection of said last-named capacitive means to a discharge circuit and to a switching circuit of its associated device, the polarity of said unidirectional source of voltage developing a charge on said capacitive means which when connected to said switching circuit renders its associated output circuit means non-conductive until dissipation of the charge whereupon said output circuit means of said last-named device is rendered conductive, operating means for the circuit controller associated with said first switching device including an energizing circuit closed and opened as said output circuit means of said second control device becomes conductive and non-conductive, and operating means for the circuit controller associated with said second device including an energizing circuit closed and opened as said output circuit means of said first device becomes conductive and non-conductive whereby said capacitive means are alternately charged and discharged for cyclically producing conduction of first one and then the other of said control devices for generating control pulses, the lengths and frequencies of which pulses are determined by the size of said capacitive means and the resistance of its said discharge circuit.

6. The system of claim 5 in which the resistance-capacitance ratio of each said discharge circuit is adjustable.

7. The system of claim 5 in which there is provided a final control element for varying between predetermined limits the magnitude of a controlled medium to maintain the magnitude of a controlled variable at a set point, and means operable under the control of one of said circuit controllers for operation of said final control element first to one and then to a second of said limits with the time said final control element remains at one of said limits determined by the relative times during which said one of said control devices is conductive relative to the time it is non-conductive.

8. A system for controlling the operation of a final control element for varying between predetermined levels the magnitude of a controlled medium to maintain the magnitude of a controlled variable at a set point by predetermining the time said final control element is maintained at one or the other of its limits, comprising an electron control device having input and output electrodes, relay means connected to said output electrode for producing operation of said final control element to one of its limits as said device is rendered conductive and for producing operation of said final control element to the other of its limits when said device is rendered non-conductive, cyclically operable means responsive to the magnitude of said controlled variable and to the operation of said relay means for alternately rendering conductive and non-conductive said electron control device, a second electron control device having input and output electrodes, capacitive means connected to said last-named input electrode, resistance means connected to said last-named input electrode and in parallel with said capacitive means to form a discharge circuit therefor, a charging circuit including a source of unidirectional voltage for charging said last-named capacitive means, said relay means having contacts for interrupting said last-named charging circuit when said relay means is in a first of its two positions, and when in the second of its two positions completing said charging circuit, said unidirectional source of voltage having a polarity for developing a charge on said capacitive means for maintaining said second electron control device non-conductive upon connection of said capacitive means thereto and until discharge of the accumulated charge to a predetermined low value, said capacitive means discharging to said predetermined low value whenever said final control element is maintained by said relay means at one of its limits for a predetermined time interval thereby to render conductive said second electron control device, second relay means connected to the output electrode of said second control device for operation when that device becomes conductive, and means operable under the control of said second relay means for modifying the action of said cyclically operable means when said second device is rendered conductive.

9. The system of claim 8 in which there are provided capacitive means for connection to the control electrode of said first electron control device, circuit transfer means including said relays for alternately establishing charging circuits for said capacitive means from said unidirectional source of voltage with concurrent disconnection of said input electrodes from said capacitive means during said charging and for establishing under the control of said relays of discharge circuits for said capacitive means, whereby upon decrease of an accumulated charge upon said capacitive means to a predetermined low value its associated one of said electron control devices is rendered conductive thereby to interrupt the charging of the capacitive means associated with the other of said control devices and to complete a connection of that capacitive means to the control electrode of said last-named control device of said other of said control devices to render said other control device non-conducting and to complete said discharge circuit for said last-named capacitive means.

10. A control system for a final control element operable between predetermined control limits for regulating the magnitude of a condition, comprising first and second electron control devices having input electrodes and output electrodes, resistive-capacitive networks, charging means for each of said resistive-capacitive networks, circuit controllers associated with said devices and selectively operable concurrently to connect one of said resistive-capacitive networks to said charging means to receive a charge and to establish a discharge circuit for the other of said networks, the polarity of said charging means developing charges on said networks to render said devices non-conductive and upon dissipation of the charge rendering said devices conductive, operating means for the circuit controller associated with said first control device including an energizing circuit connected to said output electrode of said second control device, operating means for the circuit controller associated with said second device including an energizing circuit connected to said output electrode of said first device whereby said resistive-capacitive networks are alternately charged and discharged for cyclically producing conduction of first one and then the other of said control devices for maintaining said final control element at one or the other of its two limits for a time determined by the time constant of one of said networks and for maintaining it in the other of its limits for a time determined by the time constant of the other of said networks, means manually operable relatively to adjust said time constants of said networks to regulate the relative times during which said final control element is maintained at one or the other of its said limits, manually operable switching means for disconnecting one of said resistive-capacitive networks from the input electrode of one of said electron control devices and for connecting to that electrode an input circuit for applying to said electrode input signals alternately rendering said device conductive and non-conductive, said manually operable switching means concurrently completing a discharge circuit for the other of said networks for development of an output signal from said other of said control devices whenever said final control element occupies one of its positions for a time interval approximating the time required for said last-named resistive-capacitive network to dissipate its charge and to render its associated electron device conductive, and means responsive to said last-named output signal for introducing a rate-of-approach control action in the operation of said final control element.

11. A system for controlling the operation of a final control element operable to establish two levels of magnitude of a controlled condition-varying medium comprising a first electron control device having input and output electrodes, circuit connections including resistors, capacitors and selector switches adapted to form timing networks selectively for control of said final control element and for development of an output signal indicative of a duration of one of said levels for a predetermined period of time, said selector switches establishing a first timing circuit including said capacitors connected to said input electrode and concurrently in parallel with a discharge circuit including said resistors, said selector switches in second positions establishing a partial connection of said capacitors to said input electrode and to a discharge circuit including said resistors, first relay means for said one position of said selector switches having contacts operable in one position to complete said discharge circuit and in a second position to interrupt said discharge circuit and to complete a charging circuit for said capacitors and for said other position of said selector switches completing or opening said charging circuit, said charging circuit including a unidirectional source of supply, a second electron control device having input and output electrodes, resistors and capacitors associated with said second device, means including said selector switches in said other position for connecting said last-named resistors and capacitors to form a second timing network under the control of second relay means, and means for manually adjusting the resistance-capacitance ratio of said timing networks for varying the time said final control element maintains one of said levels before change of that level to the other level of said controlled medium.

12. In combination, a bistable flip-flop device comprising two circuit-completing devices one of which is conductive at the time the other is nonconductive, a timing network including resistors and capacitors for each of said circuit-completing devices, charging means for said capacitors, a circuit controller for a first of said circuit-completing devices operable by the second of said circuit-completing devices for alternately connecting said capacitors of said timing network associated with said first circuit-completing device first to said charging means and then to a discharge circuit for operating said first of said circuit-completing devices first to one condition upon completion of said discharge circuit and then to the other condition upon predetermined discharge of said capacitors, a circuit controller operable in response to said first circuit-completing device for controlling the connections of said capacitors of said second timing network to connect them to said charging means and then to connect them to a discharge circuit for operation of said second circuit-completing device upon completion of said discharge circuit and upon predetermined discharge of said last-named capacitors.

13. The combination with an automatic control system of the duration-adjusting type including reset action for a final control element for operation of said control element to maintain the magnitude of a condition at a set point and in which there are provisions for introducing a rate of approach action in the operation of the system, of a bistable flip-flop circuit having two switching means and associated timing circuits for controlling the operation of said switching means, each of said switching means having an output circuit for controlling the charging and discharging of the timing circuit associated with the other of said switching means, means under the control of one of said switching means for controlling the operation of said final control element, a switch for disconnecting the timing circuits from said one of said switching means and for connecting the other of said timing circuits to the other of said switching means with the charging of said other timing circuit under the control of said output circuit of said one of said switching means, and means operable by said output circuit of said switching means having said effective timing circuit for producing said rate of approach action.

References Cited by the Examiner

UNITED STATES PATENTS

| | | | |
|---|---|---|---|
| 2,050,059 | 8/1936 | Koch | 331—144 |
| 2,540,478 | 2/1951 | Frost | 331—144 |
| 2,797,291 | 6/1957 | Davis | 219—20.41 |
| 2,823,861 | 2/1958 | Davis | 236—68 |
| 2,901,740 | 8/1959 | Cutsogeorge | 317—148.55 |
| 2,949,582 | 8/1960 | Sillman | 317—148.55 |

MILTON O. HIRSHFIELD, *Primary Examiner.*

RICHARD M. WOOD, *Examiner.*